June 2, 1970   A. R. MITCHELL   3,515,468
SPECTACLE HINGE
Filed Oct. 3, 1968
2 Sheets-Sheet 1
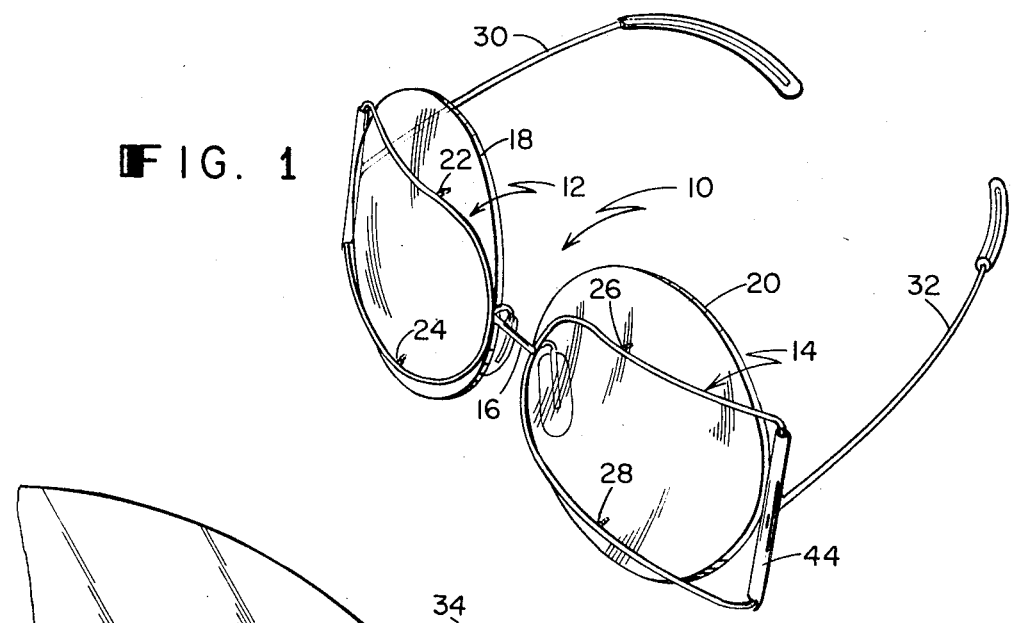
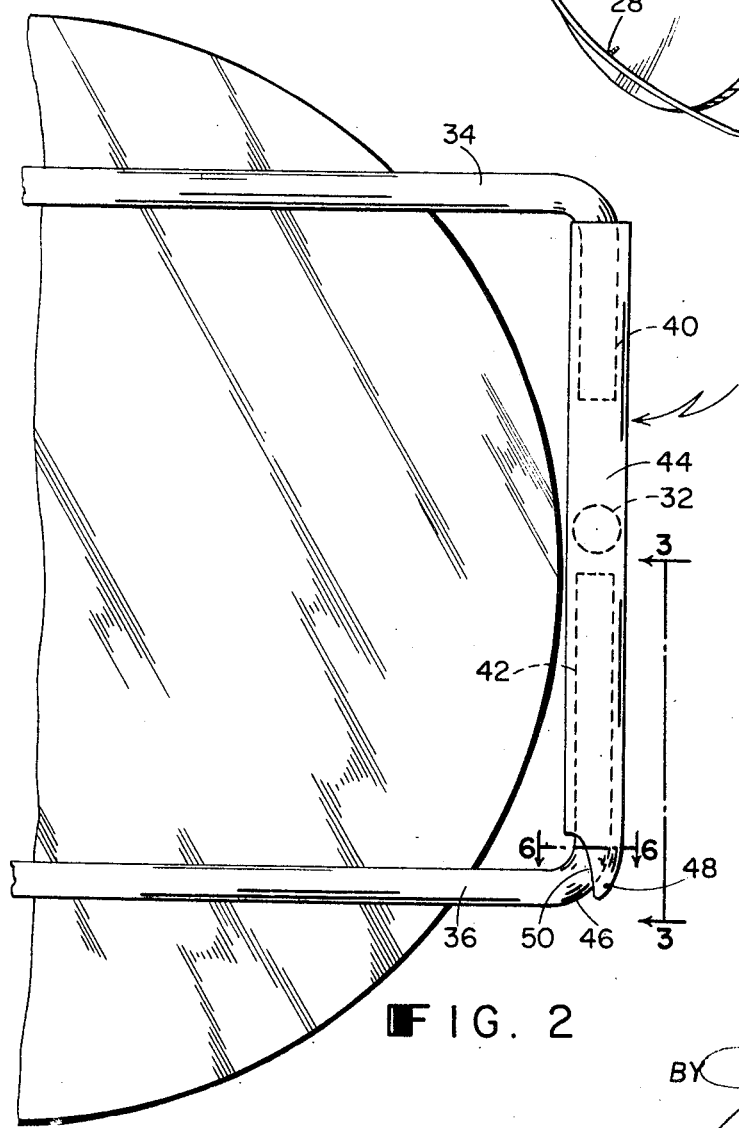
INVENTOR.
ATHERTON R. MITCHELL
BY John A. Steven
ATTORNEY.

June 2, 1970  A. R. MITCHELL  3,515,468
SPECTACLE HINGE
Filed Oct. 3, 1968  2 Sheets-Sheet 2
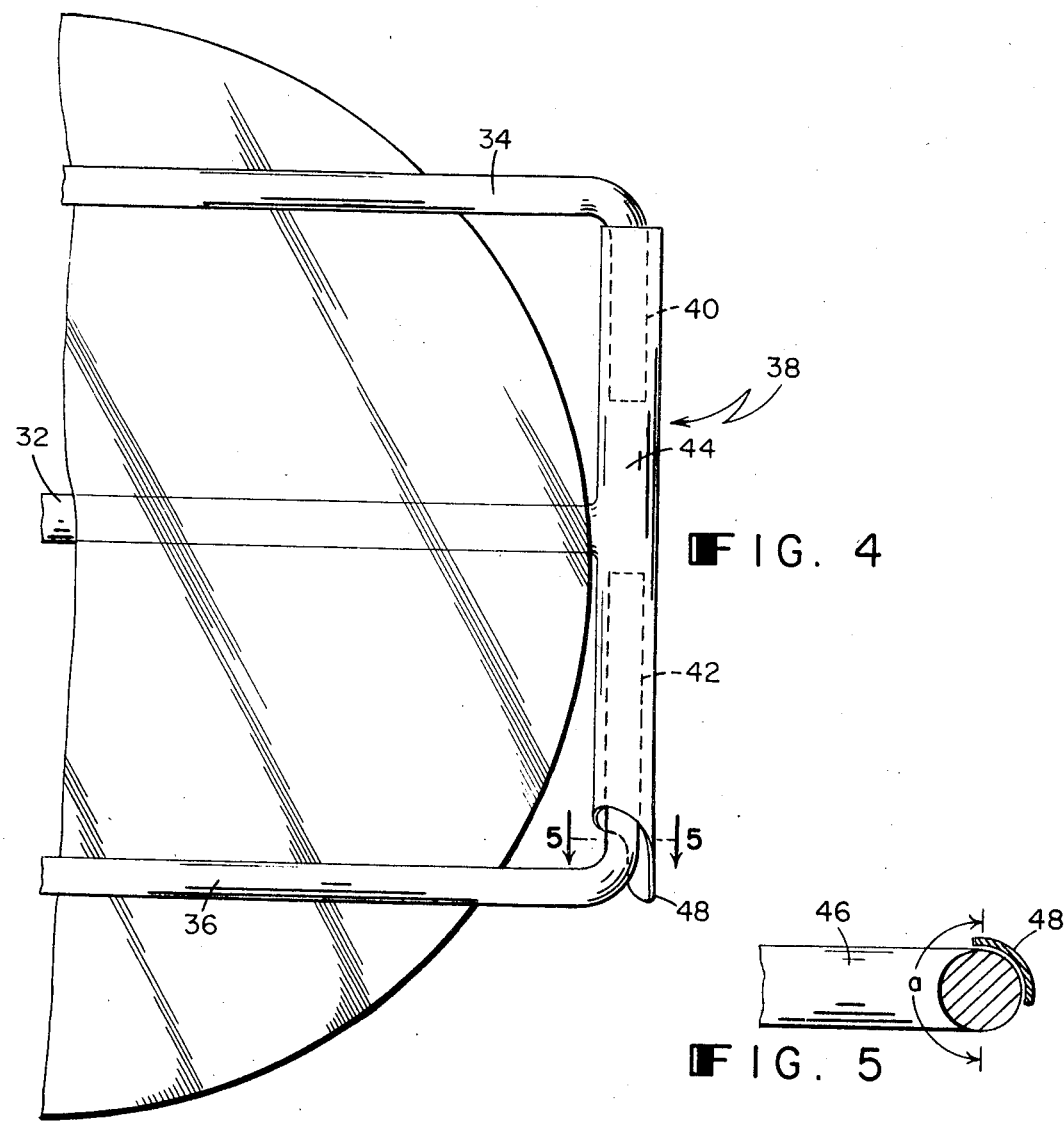
INVENTOR.
ATHERTON R. MITCHELL
BY John F. Steven
ATTORNEY.

3,515,468
SPECTACLE HINGE
Atherton R. Mitchell, San Francisco, Calif., assignor to Foster Grant Co., Inc., Leominster, Mass., a corporation of Delaware
Filed Oct. 3, 1968, Ser. No. 764,700
Int. Cl. G02c 5/22
U.S. Cl. 351—153                                   1 Claim

ABSTRACT OF THE DISCLOSURE

A hinge is provided for pivotally connecting the temples to the frame portion of a pair of spectacles. A sleeve is used on both temples which rotates about pins integral with the frame. Extended segmental portions of the sleeves cooperate with elbows on the pins to act as stops, restricting pivotal movement of the temples beyond normal positions when in use.

---

This invention relates in general to spectacles, and more specifically to spectacle hinges.

In the past, various types of hinge connections between the frame and temples of spectacles have been used. Probably the most common type of hinge used has been the multi-element interlocking type in which holes in each of the elements are aligned and a pin or screw is inserted for holding the elements together. In this particular type of hinge, the mating hinge elements are not integral with the parts to which they are attached, and hence must be connected thereto by means of pins or the like.

It is an object of the present invention to provide a hinge in which a part thereof is integral with the frame, and the other part thereof is integral with a temple.

Another object of the present invention is to provide a hinge which is simple and economical to manufacture.

Still a further object of this invention is to provide a hinge in which the temple element is positively limited in its pivotal movement relative to the frame.

Other objects as well as numerous advantages of the present invention will become more apparent from the following detailed description thereof when read in conjunction with the accompanying drawings, wherein:

FIG. 1 is a perspective view of a pair of spectacles according to my invention;

FIG. 2 is an enlarged partial front elevational view of the hinge section;

FIG. 3 is a partial side elevational view taken along line 3—3 of FIG. 2;

FIG. 4 is an enlarged partial front elevational view similar to FIG. 2, showing the hinge as it appears with the temple folded;

FIG. 5 is a sectional view taken substantially along line 5—5 of FIG. 4;

FIG. 6 is a sectional view taken substantially along line 6—6 of FIG. 2.

Referring now to the drawings in detail, a pair of spectacles 10 or uniquely designed sunglasses are illustrated having frame portions 12 and 14 connected by nose bridge 16. Lenses 18 and 20 may be mounted on the frame portion 12 and 14 respectively by an convenient means. As illustrated, lens mounting pins 22 and 24 extend through small openings (not shown) in the lens 18, and lens mounting pins 26 and 28 extend through openings (not shown) in lens 20. These pins may be bradded on their ends extending through the lenses to securely hold them in place. Connection of the frame portions 12 and 14 may be of any known means at the nose bridge.

As the hinges connecting the right temple 30 and left temple 32 will be the same, except to the opposite hand, only the left portion will be described in detail for the sake of simplicity. The left frame portion 14 includes upper and lower sections 34 and 36 respectively which terminate at hinge 38 in inwardly turned, coaxial ends or pins 40 and 42 respectively. The pins 40 and 42 are also spaced apart at their extremities and cooperate to form the inner part of hinge 38 upon which the sleeve, or outer part, 44 pivots as temple 32 is folded. The pins 40 and 42 may be inserted in sleeve 44 before the lenses 18 and 20 are attached by simply spreading the pins 40 and 42 apart until they can be inserted in the ends of sleeve 44.

The elbow 46 of section 36 cooperates with extended segmental portion 48 of sleeve 44 to limit unfolding of the temple. Thus, temples 30 and 32 may be folded into overlying position behind the lenses 18 and 20 and frame portions 12 and 14. To unfold the temple, sleeve 44 is rotated about pins 40 and 42 until the edge 50 comes in contact with elbow 46. One leg of elbow 46 thus acts as a stop to prevent pivotal movement of sleeve 44 beyond a position generally perpendicular to the lens-frame part of the spectacles. Other means may be utilized as a stop in lieu of the leg of elbow 46, such as projection or the like extending radially outwardly from the pins 40 and 42. In this instance, a slot could be utilized instead of the segmental portion 48.

Since an angular portion $a$, or about 180° of the circumference of the pin is blocked by the elbow 46, and about 90° pivotal movement should be allowed for sleeve 44, the segment 48 should extend no more than around 90° circumferentially of the sleeve as illustrated in FIGS. 5 and 6.

Various changes and modifications may be made in the present invention without departing from the spirit or scope thereof.

I claim:

1. In a pair of spectacles having a front frame portion and temples hingedly connected thereto, an improved hinge for connecting each of said temples to said frame portion comprising a pair of opposed pins integral with said frame portion, said pins being connected to said frame by elbows, said pins being substantially coaxial and spaced apart, a sleeve rotatably mounted on said pins and extending substantially to said elbows, said sleeve being integral with said temples and including a circumferential segmental portion at one end thereof that extends past the beginning of the elbow of the corresponding pin, thereby providing a stop which prevents the temple from pivoting past a preselected position with respect to the frame portion.

References Cited

UNITED STATES PATENTS 2,535,789   12/1950   De Bell.

FOREIGN PATENTS 734208    7/1955   Great Britain.
954,467   6/1949   France.

DAVID SCHONBERG, Primary Examiner
J. W. LEONARD, Assistant Examiner

U.S. Cl. X.R.
2—14; 16—128, 191; 351—106, 116, 121